United States Patent [19]

Shibata

[11] 4,234,195
[45] Nov. 18, 1980

[54] APPARATUSES FOR REPRODUCING SIGNALS FROM ROTARY RECORDING MEDIUMS

[75] Inventor: Norio Shibata, Sagamihara, Japan
[73] Assignee: Victor Company of Japan Ltd., Yokohama, Japan
[21] Appl. No.: 22,515
[22] Filed: Feb. 21, 1979
[30] Foreign Application Priority Data

Mar. 24, 1978 [JP] Japan .................................. 53/32931
Mar. 24, 1978 [JP] Japan .................................. 53/32933

[51] Int. Cl.³ .............................................. G11B 3/60
[52] U.S. Cl. ................................................ 274/39 R
[58] Field of Search ....................... 274/39 R, 39 A

[56] References Cited

U.S. PATENT DOCUMENTS

| | | | |
|---|---|---|---|
| 1,062,579 | 5/1913 | Aylsworth | 274/39 R |
| 1,906,620 | 5/1933 | Knight et al. | 274/39 R |
| 3,608,909 | 9/1971 | Rabinow | 274/39 R |
| 4,054,291 | 10/1977 | Maeda | 274/39 R |
| 4,065,135 | 12/1977 | Doughty | 274/39 R |

FOREIGN PATENT DOCUMENTS

61120 5/1968 German Democratic Rep. ... 274/39 R

Primary Examiner—John W. Shepperd
Attorney, Agent, or Firm—Haseltine, Lake & Waters

[57] ABSTRACT

An apparatus for reproducing a signal from a rotary recording medium comprises a rotary structure adapted to carry the rotary recording medium thereon and to rotate, the rotary structure being shaped to form spaces between itself and the rotary recording medium, an air suction pump, and a structure formed at the center of the rotary structure or in the vicinity thereof thereby to provide communication between the spaces and the air suction pump. The rotary recording medium is drawn into intimate contact with the rotary structure so as to eliminate any warp in the rotary recording medium and cause the rotary recording medium to rotate together with the rotary structure.

7 Claims, 30 Drawing Figures

APPARATUSES FOR REPRODUCING SIGNALS FROM ROTARY RECORDING MEDIUMS

BACKGROUND OF THE INVENTION

This invention relates generally to apparatuses for reproducing rotary recording mediums, and more particularly to improvements in an apparatus wherein a rotary recording medium such as a record disc is drawn against a rotary structure such as a turntable sheet or a turntable, on which the record disc is placed, thus making it possible to carrying out the reproducing operation in a highly satisfactory manner.

Heretofore, in apparatuses for reproducing rotary recording mediums such as the record discs, the record disc to be reproduced has been merely placed on a turntable. In such apparatuses, therefore, if the record disc is warped, it will rotate in a warped state, and will not closely contact the turntable (a state referred to as "poor adherence"). When the record disc rotates in a warped state, the pickup arm (tone arm) is adversely caused to swing in the vertically following the warp of the record disc. As the pickup arm swings, the reproducing stylus in the pickup cartridge of the pickup arm is displaced in the longitudinal direction of the sound groove. Accordingly, the reproduced signal is subject to frequency modulation, thus developing wow. Furthermore, warping of the record disc causes the cantilever to undergo rotational displacement beyond the normal range. Accordingly, the moving magnet or the like adopted to undergo vibratile motion in accordance with the signal recorded in the sound groove is also displaced beyond the normal range with a resulting loss in the linearity of power generating efficiency. As a consequence, amplitude modulation and distortion are produced.

Moreover, if the record disc adheres poorly to the turntable, sound from the speaker units will be fed back to the record disc in an acoustic manner and the resulting howling phenomenon will deteriorate the quality of the reproduced sound.

Furthermore, in a rotary recording medium such as a video disc, warping causes fluctuations in the state of contact between the reproducing stylus and the rotary recording medium, thus impairing satisfactory reproduction.

Accordingly, there have been proposed apparatuses for maintaining the record disc in close contact with the turntable so as to eliminate the above described difficulties. In one such apparatus, the warp is eliminated from the record disc and the record disc is kept in close contact with the turntable either by placing a weight on the record disc at the center thereof or alternatively by depressing the peripheral portion of the record disc by means of a ring member. However, this apparatus gives rise to difficulties in that the warping of the record disc cannot be corrected completely and that the manual operations involved are rather troublesome. Moreover, in another such apparatus, a sheet on the turntable is adopted to undergo deformation in conformance with warp of the record disc placed thereon. This apparatus, however, has a shortcoming in that the warp of record disc cannot be corrected so that wow and distortion cannot be eliminated.

SUMMARY OF THE INVENTION

It is a general object of the present invention to provide a novel and useful apparatus for reproducing a rotary recording medium in which the above described difficulties have been overcome.

Another and more specific object of the present invention is to provide a rotary recording medium reproducing apparatus adapted to cause a rotary recording medium to be drawn against a rotary structure such as a turntable sheet or a turntable on which the rotary recording medium has been placed by the sucking action of a suction pump, thus correcting any warp present in the record disc and bringing the record disc into intimate contact with the rotary structure. According to this rotary recording medium reproducing apparatus, the rotary recording medium can be reproduced or played in a warp-free state and the operation of loading and/or removing the rotary recording medium on and/or from the turntable can be carried out without difficulty.

A further object of the present invention is to provide a rotary recording medium reproducing apparatus capable of appropriately changing the area over which suction is applied at the upper surface of a rotary structure such as a turntable on which the rotary recording medium is carried. According to this apparatus, not only large size rotary recording media but also small size rotary recording media are drawn against the rotary structure.

Other objects and features of the present invention will be apparent from the following detailed description set forth in conjunction with the accompanying drawings.

DETAILED DESCRIPTION OF THE INVENTION

Figure 1:
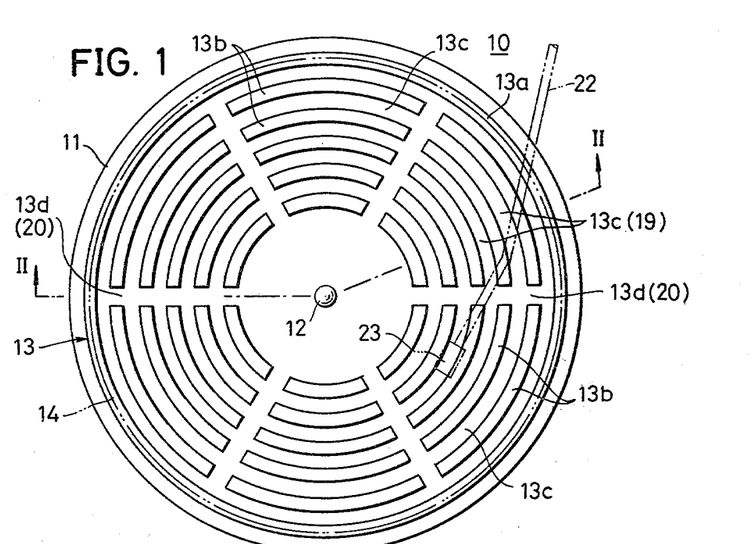
FIG. 1 is a plan view, showing a first embodiment of a rotary recording medium reproducing apparatus according to the present invention.
Figure 2:
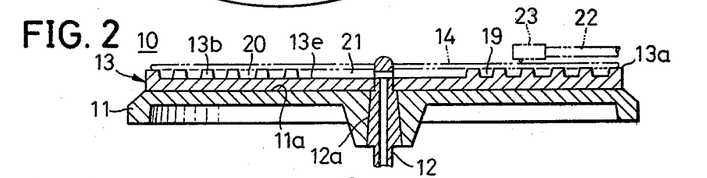
FIG. 2 is a vertical sectional view taken along the line II—II in FIG. 1 as viewed in the arrow direction.
Figure 3:
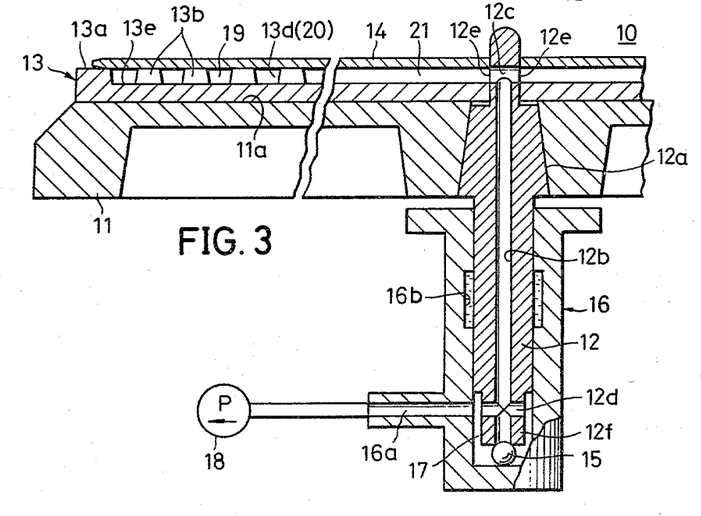
FIG. 3 is a magnified vertical sectional view, with parts cut away, showing essential parts in FIG. 2 and, further, an intake passage structure.

First, a description is given of a record player as a first embodiment of an apparatus for reproducing a rotary recording medium according to the present invention, with reference to FIG. 1, FIG. 2, and FIG. 3.

In a record player 10, which is one embodiment of the apparatus for reproducing a rotary recording medium of the present invention, an aluminum die-cast turntable 11 is fixed to a spindle 12 at a tapered part thereof and is rotated by a phonomotor through an endless belt (neither of which are shown). A turntable sheet 13 lying on the flat upper surface 11a of the turntable 11 and a record disc 14 (indicated by two-dot chain lines in FIGS. 1 and 2) lying on the sheet 13 rotate together with the turntable 11.

The spindle 12 is rotatably supported in a bearing body 16, which is of cylindrical shape and has a bottom, fixed to the player structure. The bottom surface of the spindle 12 is supported by a steel ball 15. The spindle 12 has formed therein a hole 12b extending in its axial direction. It further has a top hole 12c and a bottom hole 12d, both which extend in the diametric direction and communicate with the axial hole 12b near its top and bottom ends. The bottom hole 12d is formed in a part 12f of the spindle 12 having a smaller diameter and opens into a space 17 formed between the smaller diameter part 12f and the bearing body 16. The bearing body 16 is formed with a hole 16a which is communicatively connected with the space 17 at one end and a suction pump 18 at the other end. The bearing body 16 is further formed with a grease chamber 16b.

The above described holes 12c, 12b, 12d and 16a cooperatively serve as a suction pipe for the suction pump 18.

The turntable sheet 13 is molded from a material such as rubber or plastic resin. An annular projection 13a and a number of arcuate projections 13b are formed unitarily with the upper surface of this sheet 13. The annular projection 13a is at the periphery of the sheet 13 and the arcuate projections 13b are disposed inward of the annular projection 13a along a plurality of concentric circles with different diameters and are aligned in the radial direction of the sheet 13. Groove spaces 13c extending in the circular direction are formed between each pair of projections 13b adjacent to each other in the radial direction and groove spaces 13d extending in the radial direction are formed between each pair of projections 13b adjacent to each other in the circular direction.

The record disc 14 is laid on the sheet 13 with the outer peripheral portion thereof in contact the annular projection 13a. At this time the record disc 14 covers the groove spaces 13c and 13d thus forming circular vent passages 19 and radial vent passages 20. The plurality of circular vent passages 19 thus formed are communicatively connected through the radial passages 20 to a space 21 formed between the sheet 13 and the record disc 14 at their center parts. Openings 12e of the hole 12c are positioned to confront the space 21.

When the record disc is played, the suction pump 18 is driven either by the phonomotor for driving the turntable 11 or by a motor exclusively used to drive the pump. When the suction pump 18 is driven, the air confined in the circular passages 19 is drawn through the radial vent passages 20 to the center space 21 and is then sucked into the hole 12c through the openings 12e thereof. The air furthermore successively passes through the holes 12b, 12d, the space 17, and the hole 16a and is then pumped into the atmosphere. Accordingly, the pressure in the space between the turntable sheet 13 and the record disc 14 decreases. Thus the record disc 14 is drawn into intimate contact with the sheet 13, thereby being remedied of any warp it might have. Furthermore, since the area of record disc 14 opposite that formed with sound grooves comes into close contact with the turntable sheet 13 in numerous distributed areas, the record disc 14 is stably held in contact with the sheet 13.

In consequent, the record disc 14 rotates in a single plane and in close contact with the turntable sheet 13.

The record disc 14 is played or reproduced by a pickup cartridge 23 provided on the free end of a tone arm 22. Since the record disc 14 is held in close contact with the turntable sheet 13, good reproduction can be achieved without any howling. Furthermore, since any warp which existed in the record disc 14 has been removed, the record disc 14 lies perfectly horizontal so that the pickup stylus can stably follow the sound grooves thus preventing the occurrence of wow, distortion or the like.

Figure 4:
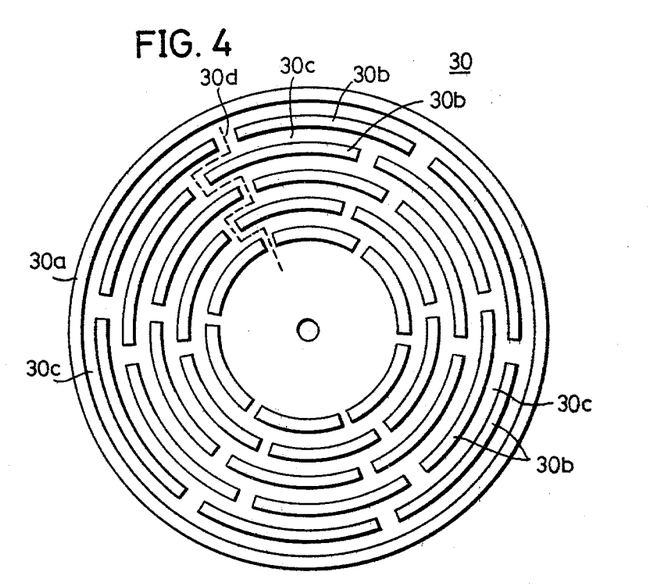
FIG. 4 is a plan view, showing a second embodiment of the turntable sheet applicable to the rotary recording medium reproducing apparatus shown in FIG. 1.

FIG. 4 shows a second embodiment of the turntable sheet. A turntable sheet 30 has an annular projection 30a at the periphery thereof and a plurality of arcuate projections 30b disposed in concentric circular pattern inward of the annular projection 30a, substantially similar to the above described turntable sheet 13. The arcuate projections 30b disposed on each of the concentric circles are staggered with respect to the projections on the adjacent concentric circles. Circular groove spaces 30c and radial groove spaces 30d (one of which is shown by a zigzag broken line) are thus formed between adjacent projections 30b. In the present embodiment and each embodiment described hereinafter, the operation whereby the air in the space between the turntable sheet and the record disc lying thereon is sucked through the holes 12c, 12b, and 12d formed in the spindle 12 to cause the record disc to be drawn into intimate contact with the turntable sheet is similar to that in the above described embodiment. Therefore, the description of this operation will not be repeated.

Figure 5:
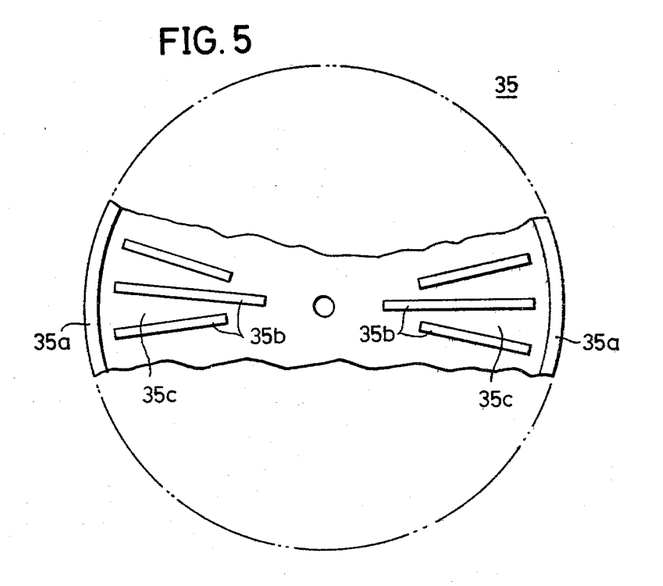
FIG. 5 and FIG. 6 are plan views, with parts cut away, respectively showing a third embodiment and a fourth embodiment of the turntable sheet applicable to the apparatus shown in FIG. 1.

FIG. 5 shows a third embodiment of the turntable sheet. A turntable sheet 35 is formed with an annular projection 35a at the outermost periphery thereof and with a plurality of linear projections 35b extending in the radial direction within an area encircled by the annular projection 35a. Groove spaces 35c are thus formed between the linear projections 35b adjacent each other in the circular direction.

Figure 6:
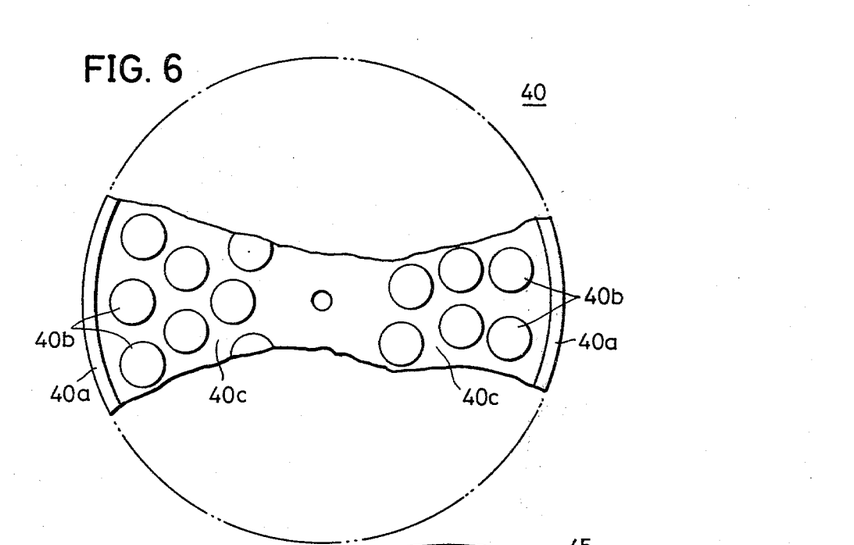

FIG. 6 shows a fourth embodiment of the turntable sheet. A turntable sheet 40 has a plurality of flattened circular column projections 40b which are disposed at intervals from each other in the area encircled by an annular projection 40a at the outermost periphery thereof. Accordingly, spaces 40c are formed between the adjacent projections 40b and these spaces 40c are communicatively connected to the center part of the turntable sheet 40.

Figure 7:
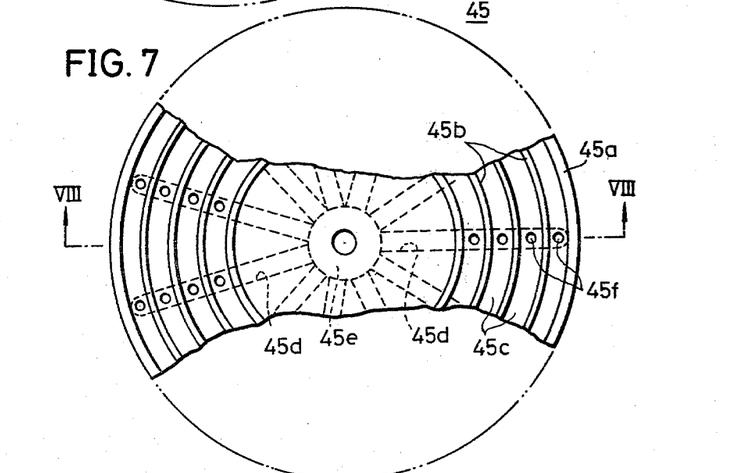
FIG. 7 is a plan view of a fifth embodiment of the turntable sheet.
Figure 9:
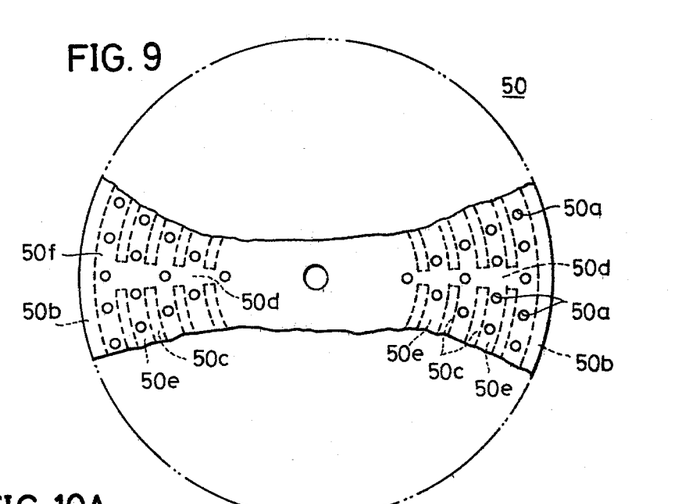
FIG. 9 is a plan view, with parts cut away, showing a sixth embodiment of the turntable sheet.

FIG. 7 and FIG. 9 show fifth and sixth embodiments of the turntable sheet. These embodiments are adapted so that the record disc is drawn against the turntable sheet which itself is drawn against the turntable due to the sucking action of the pump.

Figure 8:
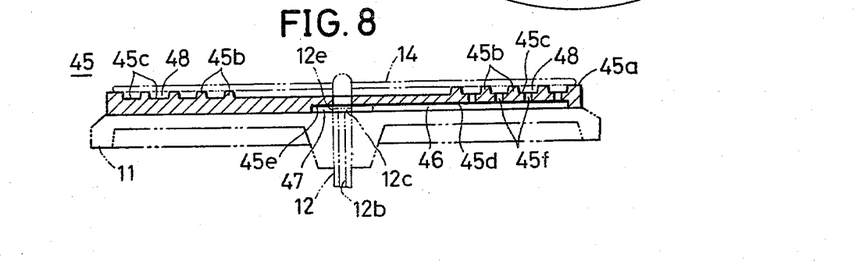
FIG. 8 is a vertical sectional view taken along the line VIII—VIII in FIG. 7 as viewed in the arrow direction.

Referring to FIG. 7 and FIG. 8, a turntable sheet 45 has an annular projection 45a formed at the outermost periphery thereof and further has a plurality of annular projections 45b which are disposed in a concentric circular pattern in the area surrounded by the annular projections 45a. Annular grooves 45c are formed between adjacent projections 45b. On the lower surface of the sheet 45, there are formed a plurality of narrow grooves 45d which extend in different radial directions of the sheet 45. These narrow grooves 45d extend outwardly up to near the outer periphery of the sheet 45 but are not open at the outer peripheral side surface. Inwardly, they open into a center groove 45e. Furthermore, within the annular grooves 45c, there are formed through-holes 45f communicatively connecting with the narrow grooves 45d on the lower surface side of the sheet 45. In FIG. 8, the turntable the spindle and the record disc are shown by two-dot chain lines and are designated by the same reference numerals as in FIG. 3.

When the turntable sheet 45 is placed on the flat turntable 11, the narrow grooves 45d become radial passages 46, and the groove 45e becomes a center space 47. When the record disc 14 is placed on the sheet 45, the annular grooves 45c becomes annular spaces 48. The suction openings 12e of the hole 12c in the spindle 12 are positioned to confront the center space 47.

When the suction pump is driven, air confined within the plurality of annular spaces 48 and within the radial passages 46 is pumped out.

Due to the suction within the annular spaces 48, the record disc 14 is drawn against the sheet 45. Simultaneously, due to suction within the passages 46, the sheet 45 is drawn against the turntable 11.

Moreover, since the projections 45b are of continuous annular shape, the possibility of damage to the reproducing stylus is lessed when the stylus is inadvertently dropped onto the sheet 45.

Referring to FIG. 9, a turntable sheet 50 has a flat upper surface with a plurality of through-holes 50a formed therein. The sheet 50 has, on the lower surface thereof, an annular projection 50b at the outermost periphery thereof and a plurality of arcuate projections 50c within the area encircled by the annular projection 50b. The arcuate projections 50c are arranged along concentric circles to have a pattern similar to that in the turntable sheet 13 indicated in FIG. 1, thus forming radial grooves 50d and arcuate grooves 50e.

Due to suction operation of the pump, the record disc is drawn into intimate contact with the sheet 50 which is similarly drawn against the turntable. According to the present embodiment, since the contacting area between the record disc and the sheet 50 is particularly large, howling is effectively prevented.

Moreover, the sheet 50 may be used upside down. The sheet 50 thus turned over similarly carries out suction operation both at the upper surface side and at the lower surface side thereof.

When the above described turntable sheets 45 and 50 are used, the record disc and the sheet, and the sheet and the turntable are drawn against each other so that these three elements act as a unitary structure, whereby excellent anti-vibration effect can be achieved and unwanted slip between the contacting surfaces is prevented, thus ensuring stable rotation of the record disc.

FIGS. 10A through 10D, FIGS. 11A through 11D, FIGS. 12A through 12F, and FIGS. 13A through 13D show seventh through tenth embodiments of the turntable. These embodiments are adapted to make the outer peripheral position of the passage extending in the radial direction changeable in conformance with the diameter of the record disc to be played so that not only large diameter record discs but also small diameter record discs can be drawn to the turntable sheet.

Referring to FIGS. 10A through 10D, a turntable sheet 60 comprises a disc-formed sheet part 61 having a diameter D1 and an annular sheet part 62 having an inner diameter D1 and an outer diameter D2 and engaged with the disc-formed sheet part 61. On the upper surfaces of the sheet parts 61 and 62, are arranged a number of arcuate projections 61a and 62a in a concentric circular manner. These projections 61a and 62a form a pattern similar to that of the sheet 13 illustrated in FIG. 1. Passages 61b and 62b extending in the radial direction connect with each other and extend up to the outermost annular projection 62c. The sheet 60 is equivalent to the turntable sheet 13 shown in FIG. 1 divided into two pieces. At the circle of the diameter D1, the arcuate projection 62a of the sheet part 62 and a low step 61d of the sheet part 61 are adjacent to each other at the side surfaces thereof.

Figures 10A, 10B, 10C:
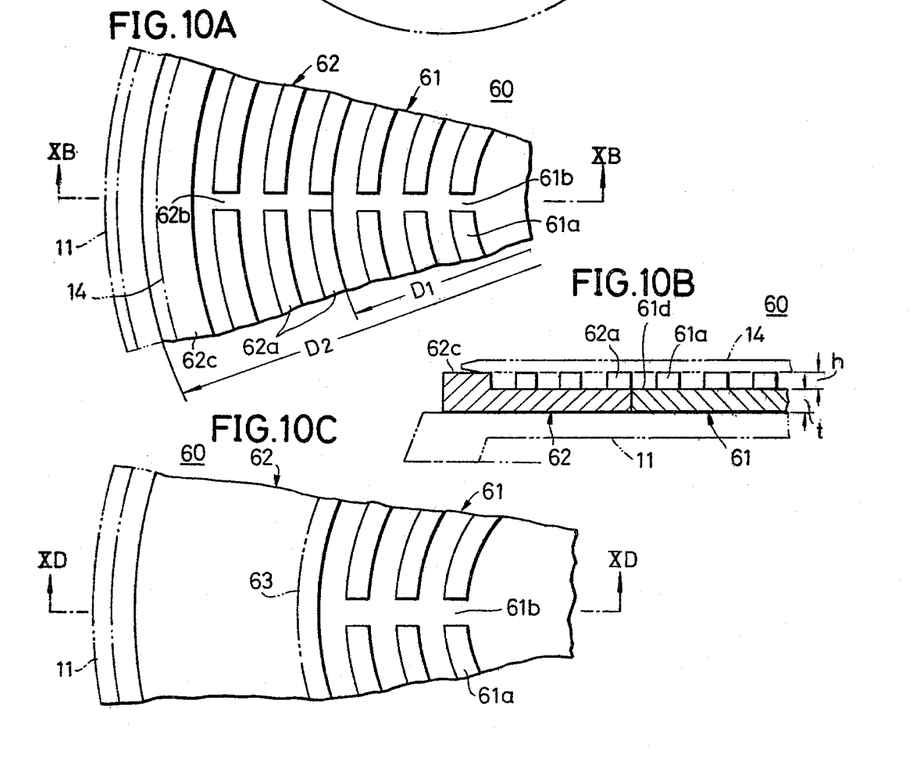
FIG. 10A is a plan view showing a part of a seventh embodiment of the turntable sheet.
FIG. 10B is a vertical section taken along the line XB—XB in FIG. 10A.
FIG. 10C is a fragmentary plan view showing the turntable sheet in FIG. 10A in another state of use.

When the sheet 60 is placed onto the turntable 11 in the state illustrated in FIGS. 10A and 10B, a large diameter record disc 14 is drawn into intimate contact with the sheet parts 61 and 62, similarly as in the case of the sheet 13.

Figure 10D:
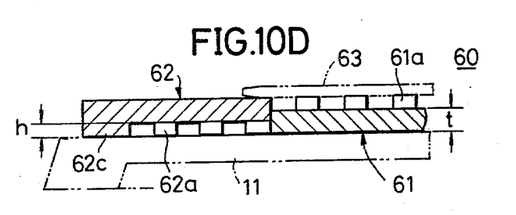
FIG. 10D is a vertical sectional view taken along the line XD—XD in FIG. 10C.

When a small diameter record disc 63 is to be drawn against the sheet 60, the annular sheet part 62 is turned over as illustrated in FIGS. 10C and 10D. The flat bases of sheet parts 61 and 62 have a thickness t which is larger than the height h of the projections 61a and 62a. Accordingly, when the sheet part 62 is turned over, the radial passages 61b are closed off at a position corresponding to diameter D1 by the inner peripheral surface of the sheet part 62. The length of the radial passages 61b is thus made shorter than was the case before the inversion of the annular sheet part 62.

When the record disc 63 is placed on the turntable sheet 60 and suction is applied, no air is sucked from the passages of the sheet part 62 but only from the passages of the sheet part 61. This air is drawn through the radial passages 61b to the center part thereof and is then pumped out to the atmosphere. Consequently, the record disc 63 is drawn into intimate contact with the sheet part 61.

Figure 11A:
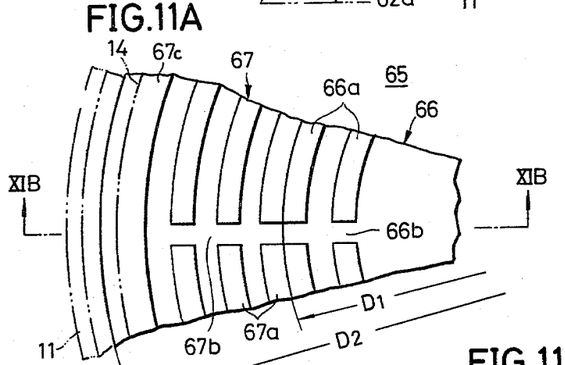
FIG. 11A is a fragmentary plan view of an eighth embodiment of the turntable sheet.
Figure 11B:
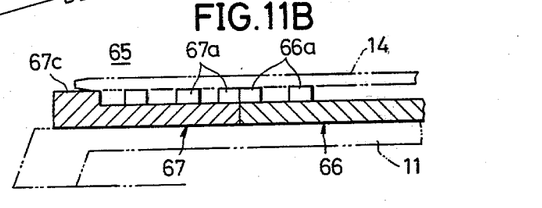
FIG. 11B is a vertical sectional view taken along the line XIB—XIB in FIG. 11A.

FIG. 11A through FIG. 11D show an eighth embodiment of the turntable sheet. Referring to FIGS. 11A and 11B, a turntable sheet 65 comprises a disc-formed sheet part 66 formed with arcuate projections 66a thereon and an annular sheet part 67 having arcuate projections 67a formed thereon and engaged with the sheet part 66 at the periphery thereof. The sheet parts 66 and 67 are engaged with the arcuate projections 66a and 67a thereof confronting each other.

When the sheet parts 66 and 67 are placed in the state illustrated in FIG. 11A, vent passages 66b and 67b extending in the radial direction in the sheet parts 66 and 67 coincide with each other so that the overall radial vent passages extend up to the outermost annular projection 67c of the sheet part 67. In this state, a large size record disc is drawn against the sheet parts 66 and 67, similar to the preceding case.

Figure 11C:
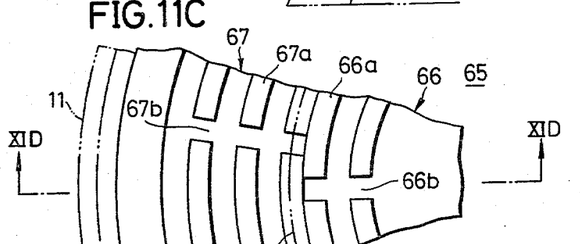
FIG. 11C is a fragmentary plan view showing the turntable sheet in FIG. 11A in another state of use.
Figure 11D:
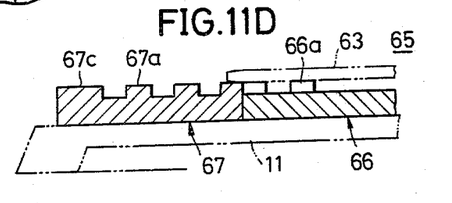
FIG. 11D is a vertical sectional view taken along the line XID—XID in FIG. 11C.

When a small size record disc 63 is to be drawn against the sheet 65, the annular sheet part 67 is rotated over a specific angle independently of the disc-formed sheet part 66. As a result of the rotation of the sheet part 67, the vent passages 67b and 68b become offset from each other and the outer end of the passage 66b is covered by the inside surface of the arcuate projections 67a on the sheet part 67.

When the record disc 63 is placed on the sheet 65 and suction is applied, air is pumped only from the passages in the sheet part 66, thereby to draw the record disc 63 against the sheet part 66, similar to the preceding case.

The manual operation of shifting the annular sheet part 67 in the circular direction is simpler than the turnover operation of the preceding example.

FIG. 12A through FIG. 12F shows a ninth embodiment of the turntable sheet. A turntable sheet 70 is capable of being adapted for a small size record disc either by shifting an annular sheet part 72 in the circular direction or turning said sheet part over.

Figures 12A, 12B, 12C:
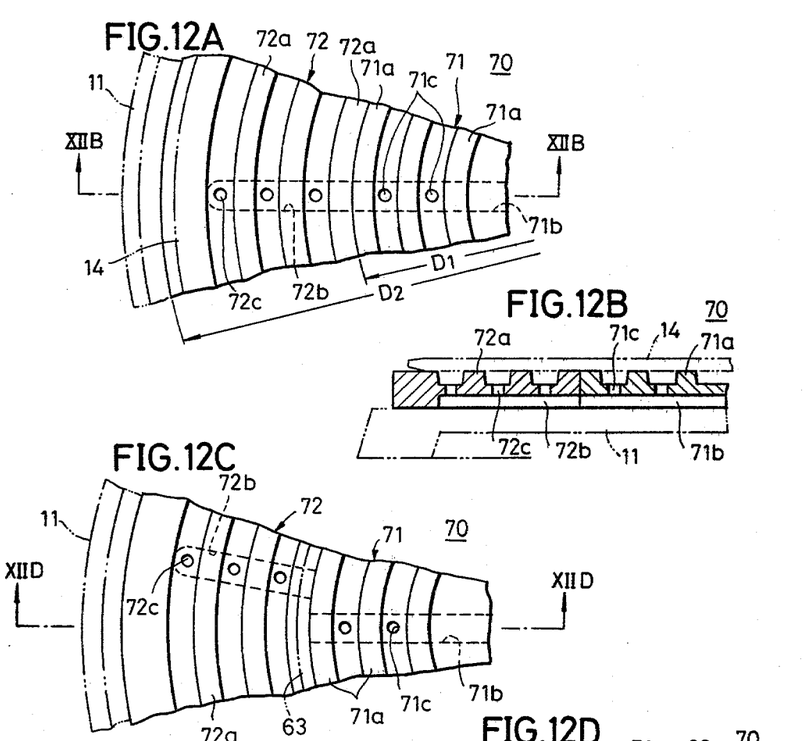
FIG. 12A is a fragmentary plan view of a ninth embodiment of the turntable.
FIG. 12B is a vertical sectional view taken along the line XIIB—XIIB in FIG. 12A.
FIG. 12C is a fragmentary plan view of the turntable sheet in FIG. 12A in another state of use.

Referring to FIG. 12A and FIG. 12B, the turntable sheet 70 consists of a disc-formed sheet part 71 and the annular sheet part 72 engaged with each other and is placed on the turntable 11. This sheet 70 is substantially equivalent to the sheet 45 shown in FIG. 7 divided into two separate pieces.

The sheet part 71 has, on the upper surface thereof, a plurality of annular projections 71a which are arranged in a concentric pattern with the outermost projection being on the periphery thereof, and on the lower surface thereof, vent passages 71b extending the radial direction thereof. In the bottoms of the grooves between adjacent annular projections 71a, through-holes 71c are formed to communicatively connect with the vent passages 71b.

The other sheet part 72 also has annular projections 72a, vent passages 72b, and through-holes 72c formed similarly to those of the sheet part 71. One annular projection 72a is located at the outermost and another at the innermost part of the sheet part 72.

In the state shown in FIG. 12A, the vent passages 71b and 72b coincide with each other and the annular projection 71a at the outermost periphery of the sheet part 71 makes contact with the annular projection 72a at the innermost periphery of the sheet part 72.

A large size record disc 14 is drawn into intimate contact with the sheet parts 71 and 72 which are in turn simultaneously drawn against the turntable 11, as illustrated in FIG. 12B.

Figures 12D, 12E:
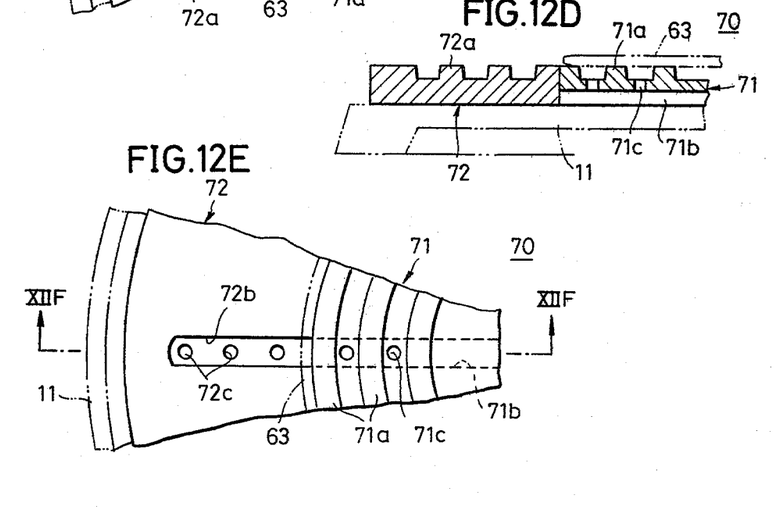
FIG. 12D is a vertical sectional view taken along the line XII—XII in FIG. 12C.
FIG. 12E is a fragmentary view of the turntable sheet in FIG. 12A in still another state of use.

In a first method of adapting the sheet 70 for use with a small record disc 63, the annular sheet part 72 is shifted in the circular direction. As a result, the openings of the vent passages 71b at the outer periphery of the sheet part 71 are closed by the inner peripheral side surface of the sheet part 72. When suction is applied in this state, air is pumped only from the passages of the sheet part 71 by way of the through-holes 71c and the vent passages 71b and the record disc 63 is thereby drawn against the sheet part 71 as shown in FIG. 12D.

In a second method of adapting the sheet 70 for use with a small record disc, the annular sheet part 72 is turned over. In this case, the openings of the vent passages 71b at the outer periphery of the sheet part 71 are closed by the inner peripheral surface of the innermost projection 72a of the sheet part 72. In the same manner as in the preceding case, the record disc is drawn against the sheet part 71 as illustrated in FIG. 12F.

The sheet part 71 is also drawn against the turntable 11 at the time the record disc 63 is drawn against the sheet part 71.

Figures 12F, 13A, 13B, 13C:
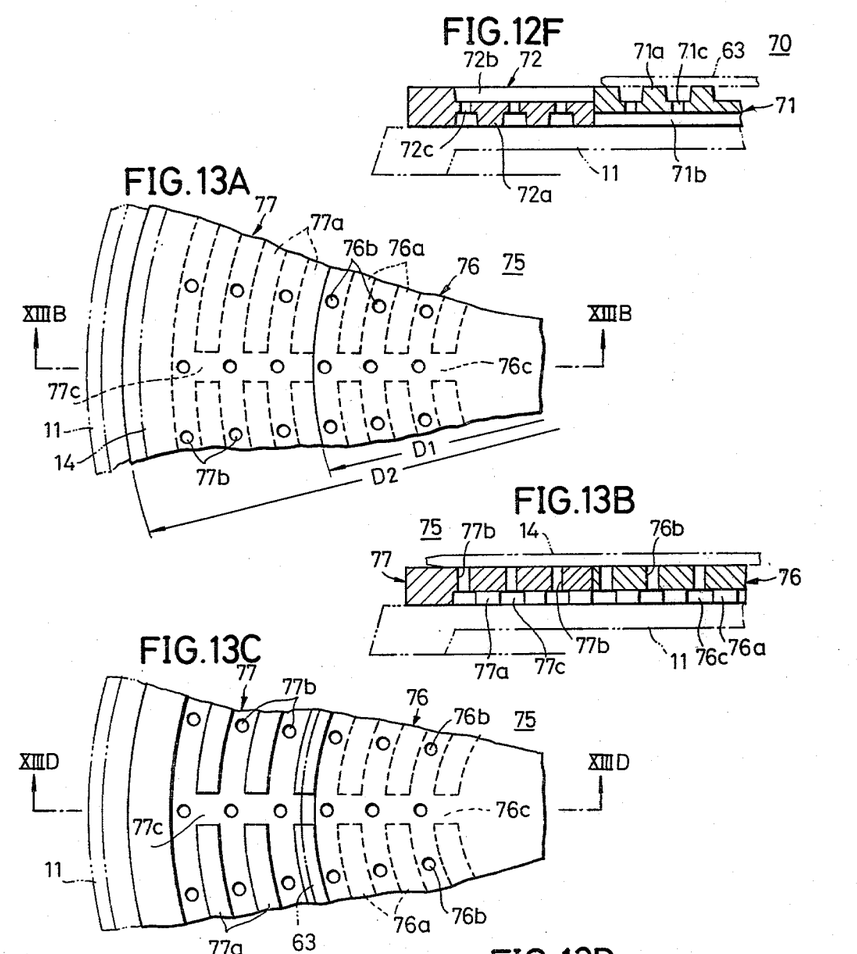
FIG. 12F is a vertical sectional view taken along the line XIIF—XIIF in FIG. 12E.
FIG. 13A is a fragmentary plan view of a tenth embodiment of the turntable sheet.
FIG. 13B is a vertical sectional view taken along the line XIIIB—XIIIB in FIG. 13A.
FIG. 13C is a fragmentary plan view of the turntable sheet shown in FIG. 13A in another state of use.

FIG. 13A through FIG. 13D show a tenth embodiment of the turntable sheet. Referring to FIGS. 13A and 13B, a turntable sheet 75 is substantially equivalent to the turntable sheet 50 shown in FIG. 9 divided into two segments and consists of a disc-formed sheet part 76 and an annular sheet part 77.

The sheet parts 76 and 77 respectively have at their lower surfaces a number of arcuate projections 76a and 77a arranged in a concentric circle pattern and further have a number of through-holes 76b and 77b formed to connect with grooves at the lower surface thereof. Vent passages 76c and 77c are aligned on the same radius.

A large size record disc 14 is drawn against the sheet parts 76 and 77 which are in turn drawn against the turntable 11, similarly as in the case of using the turntable sheet 50.

Figure 13D:
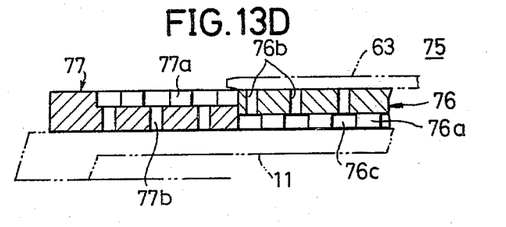
FIG. 13D is a vertical sectional view taken along the line XIIID—XIIID in FIG. 13C.

The sheet 75 is adapted for use with a small size record disc 63 by turning over the annular sheet part 77 as illustrated in FIGS. 13C and 13D. As a result, the openings of the vent passages 76c at the outer periphery of the sheet part 76 are closed by the inner peripheral surface of the sheet part 77. When the record disc 63 set in place and suction is applied, the record disc 63 is drawn into intimate contact with the sheet part 76, which is in turn drawn against the turntable 11.

In the above described seventh through tenth embodiments of the turntable sheet, the number of the annular sheet is described as being one. However, the turntable sheet of this invention is not limited to the above described embodiments and may comprise a plurality of annular sheet parts arranged in a concentric relationship with each other thus allowing various kinds of record discs to be drawn against the turntable sheet. Furthermore, alternative structures may be utilized wherein the disc-formed sheet part is made integrally with the turntable and the annular sheet part or parts are laid on the turntable.

Figures 14, 15, 16:
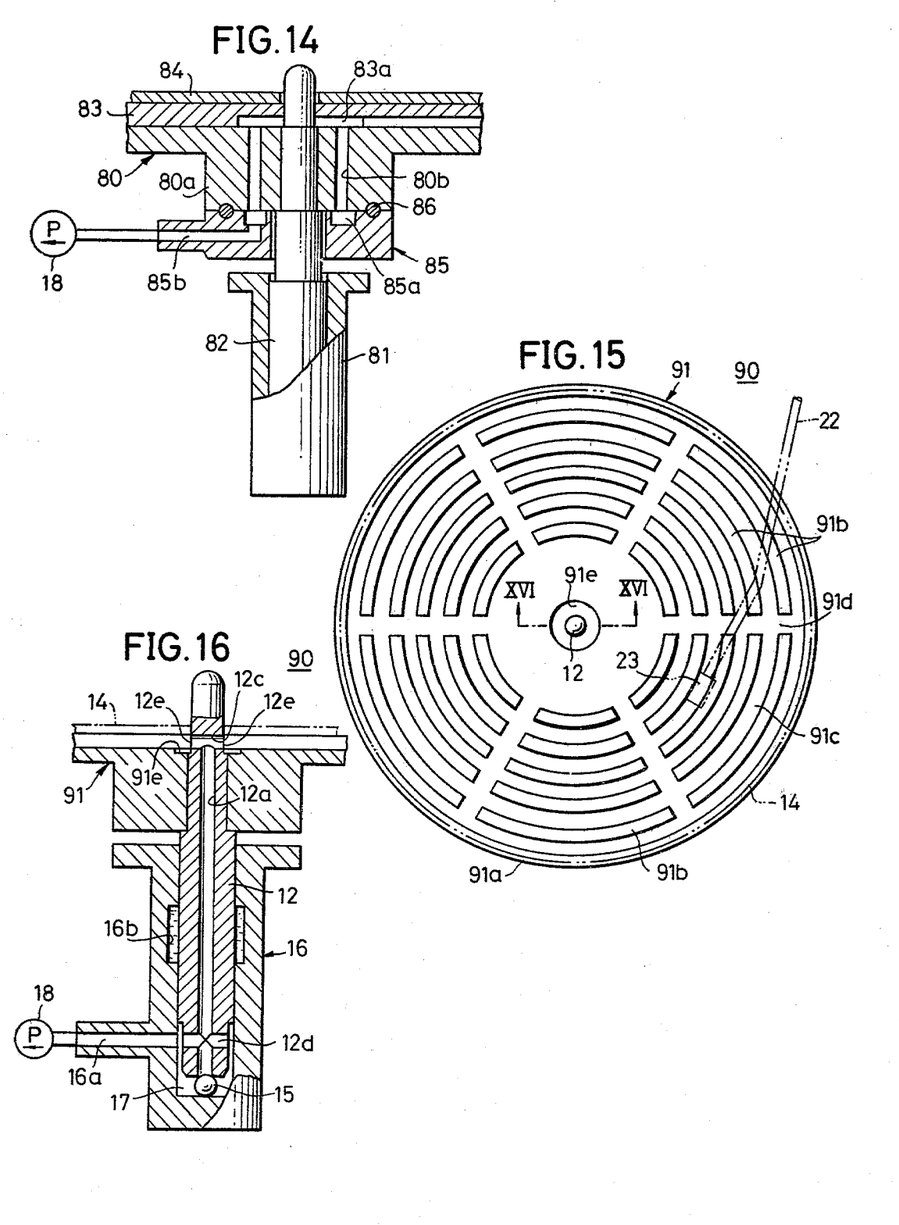
FIG. 14 is a vertical sectional view showing another embodiment of the intake passage structure in the rotary recording medium reproducing apparatus shown in FIG. 1.
FIG. 15 is a plan view of a second embodiment of a rotary recording medium reproducing apparatus according to the present invention.
FIG. 16 is an enlarged vertical sectional view taken along the line XVI—XVI in FIG. 15.

Next, a description is given of another embodiment of an intake passage structure in the record player apparatus, with reference to FIG. 14. This embodiment is arranged without forming any intake passages in the spindle. Furthermore, this embodiment is adapted to intake the air below the turntable sheet, and thereby can be applied to the turntable sheet 45, for example, illustrated in FIG. 7.

A turntable 80 is fixed on a spindle 82 which is rotatably supported in a stationary bearing body 81. In a center hub 80a of the turntable 80, there is formed a plurality of through-holes 80b which are disposed along a circle about the spindle 82 and extend in the axial direction of the spindle 82. A turntable sheet 83 formed with a space part 83at at the lower side thereof and a record disc 83 are stacked on the turntable 80.

An intake adapter 85 is fixed to the record player apparatus structure so as to fit loosely on the spindle 82 and further make contact with the lower surface of the hub 80a. A ring seal 86 is interposed between the adapter 85 and the hub 80a. On the upper surface of the adapter 85, there is formed an annular groove 85a confronting the bottom openings of the plurality of through hole 80b. The adapter 85 is further formed with a hole 85b which is communicatively connected to the annular groove 85a and is adapted to be connected to the suction pump 18.

When the suction pump 18 is driven in the record playing mode, air on the turntable and the sheet is evacuated through the through-holes 80b, the annular groove 85a and the hole 85b, with the result that the record disc 84 is drawn against the sheet 83 and that the sheet 83 is drawn against the turntable 80.

Next, a second embodiment of the apparatus for reproducing a rotary recording medium according to the present invention will be described with reference to FIGS. 15 and 16. The present embodiment has of a construction wherein the turntable itself is formed with projections substantially similar to the turntable sheet 13 shown in FIG. 1 and the intake passage structure is substantially the same as the structure illustrated in FIG. 3.

In FIGS. 15 and 16, those parts which are substantially the same as corresponding parts in FIG. 1 through FIG. 3 are designated by like reference numerals. Detailed description of such parts will not be repeated.

In a record player 90, a turntable 91 fixed to the spindle 12 has an outermost annular projection 91a and a number of arcuate projections 91b disposed inward of the annular projection 91a and 91b being formed on the upper surface thereof. Groove spaces 91c and 91d respectively extending in the circular and radial direction are formed between the projections 91b adjacent to each other. At the center of the turntable 91, there is formed a circular recess 91e, into which the openings 12e of the hole 12c open.

The record disc 14 is directly layed onto the turntable 91.

In the record playing mode, air in the groove spaces 91c and 91d of the turntable 91 is evacuated, similar to the above described record player 10, with the result that the record disc 14 is rotated while being drawn into intimate contact with the turntable 91. Accordingly, an effect similar to that obtained by the aforementioned record player apparatus 10 is obtained.

The apparatus for reproducing the rotary recording medium according to the present invention is not limited to the record player apparatuses described above but may also be applied to an apparatus for reproducing a video disc with the same effect.

Further, this invention is not limited to these embodiments but various variations and modifications may be made without departing from the scope of the invention.

What is claimed is:

1. An apparatus for reproducing a signal from a rotary recording medium comprising:
    a turntable driven to rotate by a rotation driving source;
    a turntable sheet carried on said turntable and for carrying and supporting the rotary recording medium thereon thereby to rotate therewith, said turntable sheet comprising an upper base surface, a continuous projection disposed along the outer periphery of said rotary structure and for carrying thereon the peripheral edge of said rotary recording medium, a plurality of projections dispersed inward of said peripheral continuous projection and for carrying thereon said rotary recording medium, holes formed to extend in the direction of the thickness of said turntable sheet and open at said upper base surface and grooves formed in the lower surface of said turntable sheet communicatively connected with said holes and extending up to near the center of said turntable, first enclosed spaces being formed between a rotary recording medium carried on said projections and the upper base surface of said turntable sheet and second enclosed spaces being formed between said grooves in said turntable sheet and said turntable;
    a spindle for the turntable;
    air suction means; and
    a communication structure communicating said enclosed spaces formed between said turntable sheet and said rotary recording medium to said air suction means, said communication structure comprising a first communication passage formed in said spindle to provide communication to said second enclosed spaces, and a second communication passage for communicatively connecting said first communication passage to said air suction means.

2. An apparatus for reproducing a signal from a rotary recording medium comprising:
    a turntable driven to rotate by a rotation driving source;
    a turntable sheet carried on said turntable and for carrying and supporting the rotary recording medium thereon thereby to rotate therewith, said turntable sheet comprising an upper surface on which said rotary recording medium is carried, a plurality of holes opening to said upper surface and extending in the direction of thickness of said turntable sheet and grooves formed on the lower surface of said turntable sheet, said grooves communicating to said holes and extending up to near the center of said turntable sheet, and enclosed spaces being formed in said holes and grooves between said rotary medium carried on said upper surface and said turntable;
    a spindle for the turntable;
    air suction means; and
    a communication structure communicating said enclosed spaces formed between said turntable sheet and said rotary recording medium to said air suction means, said communication structure comprising a first communication passage formed in said spindle to provide communication to said enclosed space and a second communication passage for communicatively connecting said first communication passage to said air suction means.

3. An apparatus for reproducing a signal from a rotary recording medium as recited in claim 2, in which said turntable sheet further comprises a plurality of flattened circular column projections being disposed at intervals from each other in an area encircled by an annular projection at the outermost periphery thereof and said enclosed spaces being formed between the adjacent projections and said spaces are being connected to the center part of the turntable sheet.

4. An apparatus for recording a signal from a rotary recording medium as recited in claim 2, in which said turntable sheet further comprises a plurality of annular projections at the outermost periphery thereof and a plurality of linear projections extending in the radial direction within an area encircled by the annular projections and said spaces are being formed between the linear projections adjacent to each other in the circular direction.

5. An apparatus for reproducing a signal from a rotary recording medium comprising:
   a turntable driven to rotate by a rotation driving source;
   turntable sheets carried on said turntable and for carrying and supporting the rotary recording medium thereon thereby to rotate therewith, said turntable sheets comprising an annular first turntable sheet provided unitarily with an upper base surface, a continuous peripheral projection for carrying thereon the peripheral edge of a rotary recording medium having a specific diameter and a plurality of arcuate projections dispersed inward of said peripheral projection for carrying thereon said rotary recording medium, and a second turntable sheet being fit inside of said first turntable sheet and being of a diameter smaller than that of a rotary recording medium having a specific small diameter, and being provided unitarily with an upper base surface, and a plurality of arcuate projections for carrying thereon said rotary recording medium, grooves between the adjacent arcuate projections at the innermost periphery of said first turntable sheet being communicatively connected to grooves between the adjacent arcuate projections at the outermost periphery of said second turntable sheet only when said first and second turntable sheets are in a specific relative position with respect to each other;
   a spindle for the turntable;
   air suction means; and
   a communication structure communicating said grooves formed between said turntable sheet and said rotary recording medium to said air suction means.

6. An apparatus for reproducing a signal from a rotary recording medium comprising:
   a turntable driven to rotate by a rotation driving source;
   a turntable sheet carried on said turntable and for carrying and supporting the rotary recording medium thereon thereby to rotate therewith, said turntable sheet comprising an annular first turntable sheet having an upper surface for carrying thereon a rotary recording medium having a specific large diameter, a plurality of holes formed to open at said upper surface and to extend in the direction of thickness, and grooves formed on the lower surface providing communication with said holes and extending up to near the inner periphery thereof, and
   a second turntable sheet fit inside of said first turntable sheet and being of a diameter smaller than that of a rotary recording medium having a specific small diameter and having an upper surface for carrying thereon said rotary recording medium, a plurality of holes formed to open at said upper surface and to extend in the direction of thickness, and grooves formed to communicatively connect with said holes and to extend up to near the center thereof, said grooves of said first turntable sheet being communicatively connected to said grooves of said second turntable sheet only when said first and second turntable sheets are in a specific relative position with respect to each other;
   a spindle for the turntable;
   air suction means; and
   a communication structure communicating said grooves formed between said turntable sheet and said rotary recording medium to said air suction means.

7. An apparatus for reproducing a signal from a rotary recording medium comprising:
   a turntable driven to rotate by a rotation driving source;
   a turntable sheet carried on said turntable and for carrying and supporting the rotary recording medium thereon thereby to rotate therewith, said turntable sheet integrally comprising an upper base surface, a continuous projection disposed along the outer periphery of said rotary structure and for carrying thereon the peripheral edge of said rotary recording medium, and a plurality of projections dispersed inward of said peripheral continuous projection and for carrying thereon said rotary recording medium,
   enclosed spaces being formed between the rotary recording medium carried on said projections and the upper base surface of said turntable sheet;
   a spindle for the turntable;
   air suction means; and
   a communication structure communicating said enclosed spaces formed between said turntable sheet and said rotary recording medium to said air suction means,
   said communication structure comprising an opening formed in said spindle and opening at a position higher than the upper base surface of said rotary structure and communicating to said spaces, a first communication passage communicating to said opening and extending through the spindle, and a second communication passage for communicatively connecting said first communication passage to said air suction means.

* * * * *